United States Patent [19]

Abo et al.

[11] Patent Number: 4,640,243

[45] Date of Patent: Feb. 3, 1987

[54] SYSTEM AND METHOD FOR CONTROLLING INTAKE AIR FLOW FOR AN INTERNAL COMBUSTION ENGINE

[75] Inventors: Toshimi Abo, Yokohama; Yoshitaka Hata, Fujisawa, both of Japan

[73] Assignee: Nissan Motor Company, Limited, Yokohama, Japan

[21] Appl. No.: 704,268

[22] Filed: Feb. 22, 1985

[30] Foreign Application Priority Data

Feb. 24, 1984 [JP] Japan ................................ 59-32665

[51] Int. Cl.$^4$ .............................................. F02D 9/00
[52] U.S. Cl. .................................... 123/399; 123/361
[58] Field of Search ............... 123/352, 360, 361, 399, 123/400, 401, 478

[56] References Cited

U.S. PATENT DOCUMENTS

| | | | |
|---|---|---|---|
| 4,168,679 | 9/1979 | Ikeura et al. | 123/399 X |
| 4,346,776 | 8/1982 | Toplin | 123/342 X |
| 4,453,516 | 6/1984 | Filsinger | 123/399 X |
| 4,471,741 | 9/1984 | Asik et al. | 123/478 |
| 4,519,360 | 5/1985 | Murakami . | |
| 4,519,361 | 5/1985 | Murakami . | |
| 4,524,745 | 6/1985 | Tominari et al. | 123/478 |
| 4,549,517 | 10/1985 | Kamiyama | 123/478 |

FOREIGN PATENT DOCUMENTS 43626 4/1975 Japan .
12266 1/1980 Japan .

*Primary Examiner*—Tony M. Argenbright
*Attorney, Agent, or Firm*—Schwartz, Jeffery, Schwaab, Mack, Blumenthal & Evans

[57] ABSTRACT

A system and method for controlling intake air flow of an internal combustion engine wherein the response of intake manifold pressure to changes in throttle valve position is controlled in accordance with an engine operating parameter and the gear position of an engine transmission, whereby jerk during acceleration or deceleration can be minimized and engine drivability can be harmonized with engine responsiveness.

14 Claims, 19 Drawing Figures

SYSTEM AND METHOD FOR CONTROLLING INTAKE AIR FLOW FOR AN INTERNAL COMBUSTION ENGINE

BACKGROUND OF THE PRESENT INVENTION

1. Field of the Invention

The present invention relates generally to the system and method for controlling intake air flow for an engine and particularly to a system and method wherein the speed and response of intake manifold pressure to depression of an accelerator pedal or operation of such an acceleration mechanism varies according to engine operating conditions and transmission gear position so that the responsiveness of the engine can be improved together with drivability without unfavorable vibrations.

2. Description of the Prior Art

Most gasoline engines used nowadays in vehicles have throttle valves mounted in intake manifolds and mechanically linked to acceleration mechanism such as accelerator pedals. Therefore, the vehicle driver can control engine output directly through depression of the accelerator pedals.

FIG. 1 shows an example of a conventional intake air flow control system.

In FIG. 2, numeral 1 denotes an airflow meter for measuring intake air quantity, numeral 2 denotes a throttle valve, numeral 3 denotes an intake manifold, numeral 4 denotes an intake air valve or intake air valves of an engine cylinder 7, numeral 5 denotes an exhaust valve or exhaust valves, numeral 6 denotes a piston of the engine cylinder 7, and numeral 8 denotes an accelerator pedal.

Since the accelerator pedal 8 is mechanically linked to the throttle valve 2, as represented by the dotted line in FIG. 1, the angle through which the accelerator pedal 8 is depressed directly corresponds to the angle through which the throttle valve 2 is opened.

FIG. 2 illustrates the response of the system shown in FIG. 1 with regard to intake air flow in response to a rapid change in the opening angle of the throttle valve.

In FIG. 2, symbol A1 denotes the flow cross-section past the throttle valve 2 and symbol P1 denotes the equilibrium pressure in the intake manifold 3 (intake passage negative pressure) when the engine is operating at the above-described flow cross-section A1. The symbol A2 denotes a subsequent flow cross-section resulting when the throttle valve 2 is abruptly actuated to a new opening angle and symbol P2 denotes the subsequent equilibrium pressure in the intake manifold 3 when the engine is operating at the above-described flow cross-section A2.

If the volume of the engine cylinder 7 is Vh, the volume of the intake manifold 3 is V, and engine revolution speed is N, the pressure in the intake manifold 3 changes from P1 to P2 with an exponential time constant $\tau$ as expressed below in the case where the opening angle of the throttle valve is changed in a stepwise manner from A1 to A2.

$\tau = V/(C1 \cdot A2 + C2 \cdot Vh \cdot N)$, where C1 and C2 are constants.

As appreciated from the expression, the time constant $\tau$ is proportional to the volume of the intake manifold V and inversely proportional to the sum of the flow cross-section A for intake air flow and the intake air flow rate into the engine through the intake manifold 3, i.e., $Vh \times N$.

In addition, the intake air quantity Q drawn into each engine cylinder 7 in each engine revolution is given by multiplying the intake manifold pressure P by the charging efficiency $\eta$ determined by the engine speed or torque ($Q = \eta \cdot P$).

Hence, assuming an amount of fuel accurately corresponding to the intake air quantity is supplied to the engine through a carburetor or fuel injection valve, the response of the output torque of the engine which is proportional to the charging efficiency $\eta$ substantially matches that of the intake manifold pressure P.

As appreciated from the above-mentioned expression, the time constant relates the intake manifold pressure P inversely to the flow cross-section (opening angle of the throttle valve) assuming the engine revolution speed N is constant. That is to say, the response is slower in a low-load range in which the throttle valve 2 is nearly closed and, on the other hand, is faster in a high-load range in which the throttle valve 2 is almost fully opened.

Taking the responsiveness of the engine as a whole into consideration, it is preferable to achieve the fastest possible intake manifold pressure response. On the other hand, it is preferable to have a slower response in order to prevent vehicle vibrations which may occur when the engine decelerates or accelerates (so-called jerk). This is especially true when the transmission is in a lower gear position (first gear or second gear).

However, in the conventional system shown in FIG. 1, it is impossible to freely control the degree of responsiveness described above since the throttle valve is mechanically linked to the accelerator pedal. In addition, although Japanese Patent Laid Open Application No. Sho. 50-43626 and Japanese Patent Laid Open Application No. Sho. 56-107925 disclose a method wherein the angle through which the accelerator pedal is depressed is electrically detected and the opening angle of the throttle valve is controlled on the basis of the position of the accelerator pedal and other engine operating conditions, these methods do not control the responsiveness of the intake manifold pressure described above.

SUMMARY OF THE INVENTION

With the above-described problem in mind, it is an object of the present invention to provide a system and method for controlling intake air flow for an internal combustion engine wherein the response speed is varied according to engine operating conditions and the position of transmission gear lever so that good responsiveness can be achieved without jerking.

The above object can be achieved by providing a system for an internal combustion engine, comprising (a) first means for monitoring at least one engine operating variable, (b) second means for detecting a gear position of an engine transmission, and (c) third means for variably controlling the rate of change of negative pressure in an intake manifold in response to changes in desired intake air flow in accordance with the engine operating variable monitored by the first means and the gear position of the engine transmission detected by the second means.

BRIEF DESCRIPTION OF THE DRAWINGS

A more complete understanding of the present invention may be obtained by the foregoing description taken in conjunction with the attached drawings in which like reference numerals designate corresponding elements and in which.

DETAILED DESCRIPTION OF THE PREFERRED EMBODIMENTS

Reference will hereinafter be made to the drawings in order to facilitate understanding of the present invention.

Figure 3:
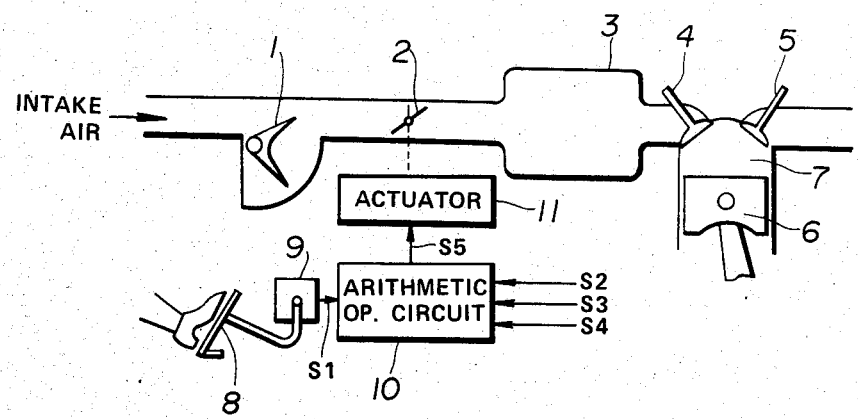
FIG. 3 is a simplified block diagram of a first preferred embodiment according to the present invention.

FIG. 3 shows a first preferred embodiment according to the present invention.

In FIG. 3, numeral 9 denotes an acceleration sensor for monitoring the depression angle of an accelerator pedal 8. The acceleration sensor 9, for example, may be a potentiometer designed to generate a voltage proportional to the angle through which the accelerator pedal 8 is depressed.

An arithmetic operation unit 10 may consist of, for example, a microcomputer including a Central Processing Unit (CPU), Input/Output port, Random Access Memory (RAM), and Read-Only Memory (ROM). Numeral 11 denotes an actuator which drives a throttle valve 2 of the engine so as to control its opening angle. The actuator 11 is mechanically linked to the throttle valve 2 as represented by the dotted line.

The arithmetic operation unit 10 receives a signal $S_1$ indicating the angle through which the accelerator pedal is depressed from the acceleration sensor 9, a signal $S_2$ indicating the gear position of the transmission from a conventional gear position switch (not shown), a signal $S_3$ indicating the engine revolution speed from a conventional crank angle sensor (not shown), and a signal $S_4$ indicating intake air guantity from the air flow meter 1 and outputs a command signal $S_5$ to the actuator 11 to adjust the opening angle of the throttle valve 2.

Figure 4:
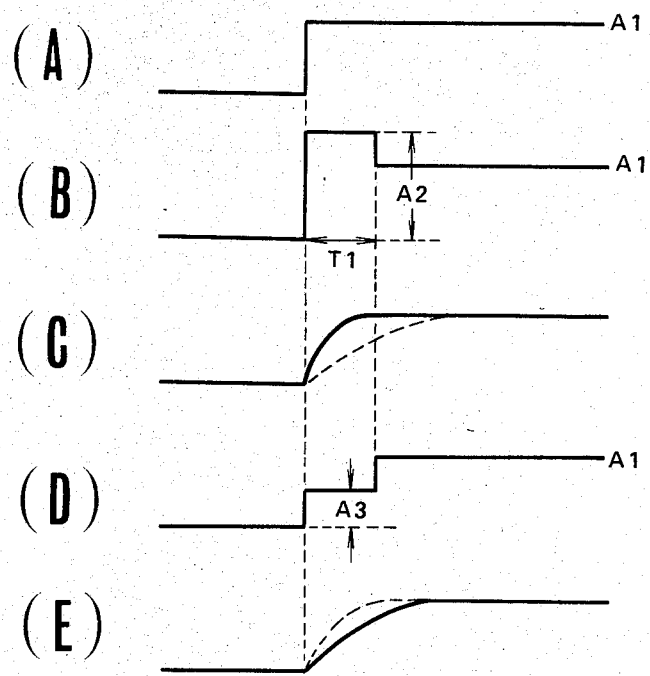
FIGS. 4a–4e show the behavior of intake manifold pressure in response to changes in throttle valve position in the system shown in FIG. 3.

In FIG. 4, if the opening angle of the throttle valve 2 is changed stepwise as shown by (A), the flow cross-section of the intake passage 3 is A1, and engine revolution speed is denoted by N, the negative pressure in the intake manifold responds in the form of a decay curve of time constant $\tau$, i.e., $\tau = V/(C_1 \cdot A_1 + C_2 \cdot V_h \cdot N)$, wherein Vh denotes the volume of the engine cylinder 7 and C1 and C2 denote constants. The time constant $\tau$ of change of intake pipe negative pressure generates the curve shown in dotted lines in (C).

In this case, depending on the current driving conditions indicated by, e.g., the signal S2 indicating the position of transmission gear position, and engine operating conditions (to be described later) indicated by singal S3 indicating engine revolution speed and signal S4 indicating the intake air quantity, the arithmetic unit 10 may decide that a response faster than that resulting from the above-described time constant $\tau$ would be desirable especially if engine speed, gear position and/or torque are high enough to prevent any change of jerking. In such cases, the arithmetic operation unit 10 briefly outputs an opening angle command signal which induces an enhanced flow cross-section A2. In response thereto, the opening angle of the throttle valve 2 is increased to A2 (>A1) for a constant period of time T1 as shown by (B) after which the throttle valve 2 is moved to the desired position A1. Consequently, the response of negative pressure in the intake manifold is enhanced, as can be seen by comparing the solid and broken curves of (C).

Figure 1:
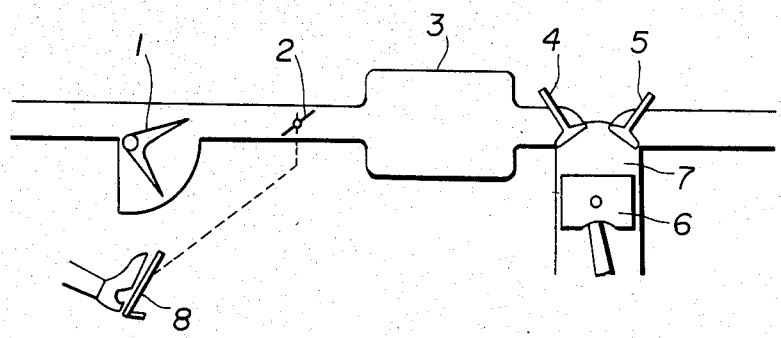
FIG. 1 is a simplified block diagram of a conventional system for controlling intake air flow.
Figure 2:
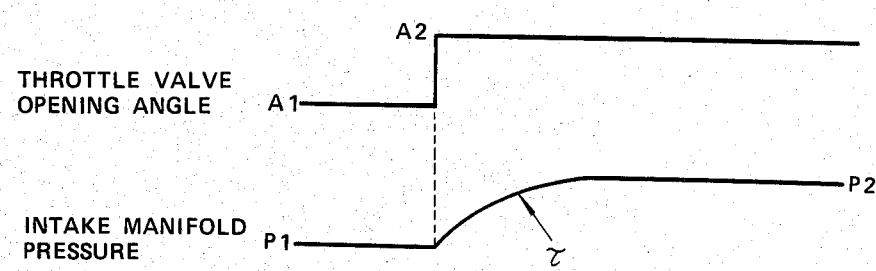
FIG. 2 shows the behavior of important parameters of the conventional system shown in FIG. 1.

On the other hand, if the arithmetic operation unit 10 decides that a slower response is desirable on the basis of engine operating conditions, especially when engine speed, torque and gear position are relatively low, the opening angle of the throttle valve 2 is adjusted to an angle A3 which is narrower than A1 for a brief period of time T1 and then actuated to the desired position A1. The negative pressure of the intake air passage increases more slowly in this case as shown by the solid curve of (E). It should be noted that the dotted curve of (E) shows the response of intake manifold pressure to a change in the opening angle of the throttle valve 2 as shown in (A) in the conventional system shown in FIG. 1.

Figure 5:
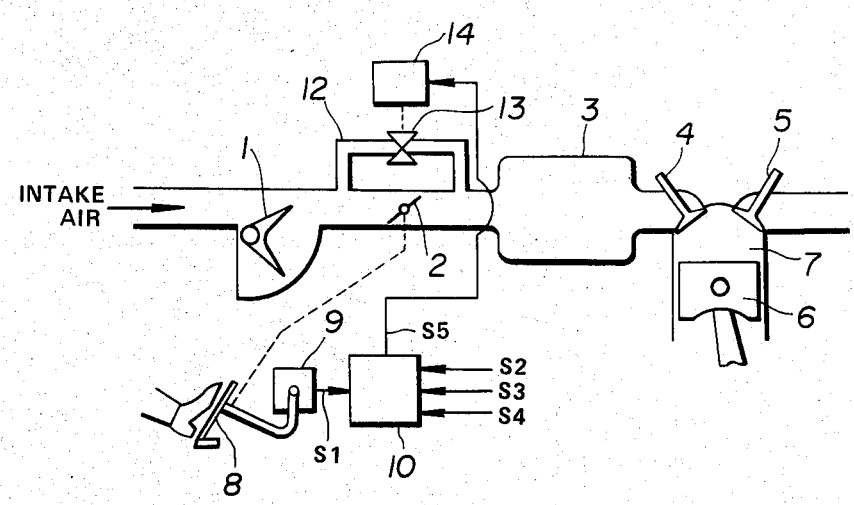
FIG. 5 is a simplified block diagram of a second preferred embodiment.

FIG. 5 shows a second preferred embodiment according to the present invention.

In FIG. 5, numeral 12 denotes a bypass passage bypassing the throttle valve and numeral 13 denotes a bypass valve through which the flow of intake air through the bypass 12 is controlled. In addition, numeral 14 denotes an actuator for driving the bypass valve 13 to adjust the flow cross-section of the bypass passage. The actuator 14 is mechanically linked to the bypass valve 13 and electrically controlled by the arithmetic operation unit 10, as was the throttle valve 2 of FIG. 3.

In addition, the accelerator pedal 8 and the throttle valve 2 are mechanically coupled shown by the dotted line in the configuration of FIG. 5.

The operation of the system shown in FIG. 5 will be described with reference to FIG. 6.

Figure 6:
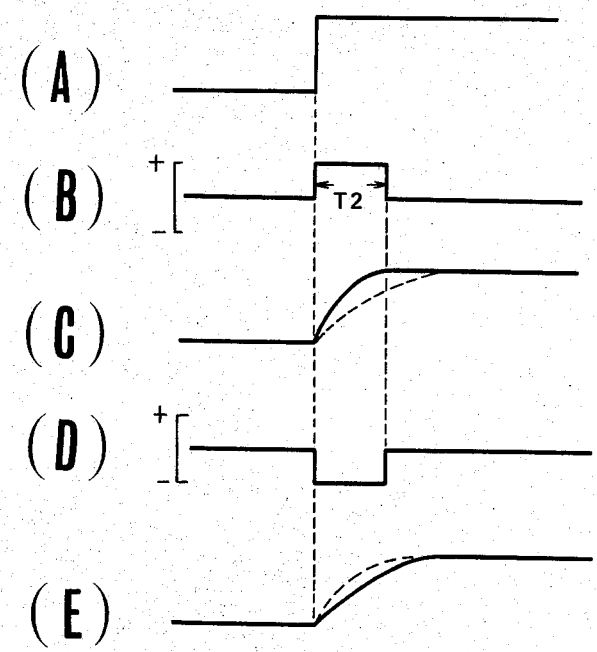
FIGS. 6a–6e are similar to FIG. 4 for the system shown in FIG. 5.

Since the throttle valve 2 is directly linked to the accelerator pedal 8 in the system shown in FIG. 5, if the accelerator pedal 8 is operated stepwise, the opening angle of the throttle valve is correspondingly changed as shown in (A) of FIG. 6. The response waveform of the intake manifold negative pressure is shown by the dotted curve in (C).

On the other hand, if the degree of opening of the bypass valve 13 before the stepwise change of the depression angle by means of the accelerator pedal 8 is approximately halfway between the fully closed and fully-open positions, the bypass valve 13 is opened for a brief predetermined time T2 upon the occurrence of the positive-going stepwise change so that the total flow cross-section through which intake air passes is increased and the response of the intake manifold negative pressure can be expedited.

In this case, the response of the negative pressure in the intake pipe is shown by the solid curve of (C).

On the other hand, if the response of the negative pressure in the intake pipe is to be retarded, the bypass valve 13 is closed for the predetermined time T2. In this case, the response of the negative pressure of the intake pipe is shown by the solid curve of (E). It should be noted that the dotted curve of (E) represents the case in which the bypass valve 13 is held in its central position.

It should also be noted that the aboveidentified bypass valve 13 is disclosed in Japanese Patent Laid Open Application No. Sho. 55-12266 wherein the bypass valve is used in an engine revolution speed control system for an internal combustion engine. The disclosure of this published Application is hereby incorporated by reference.

Figure 7:
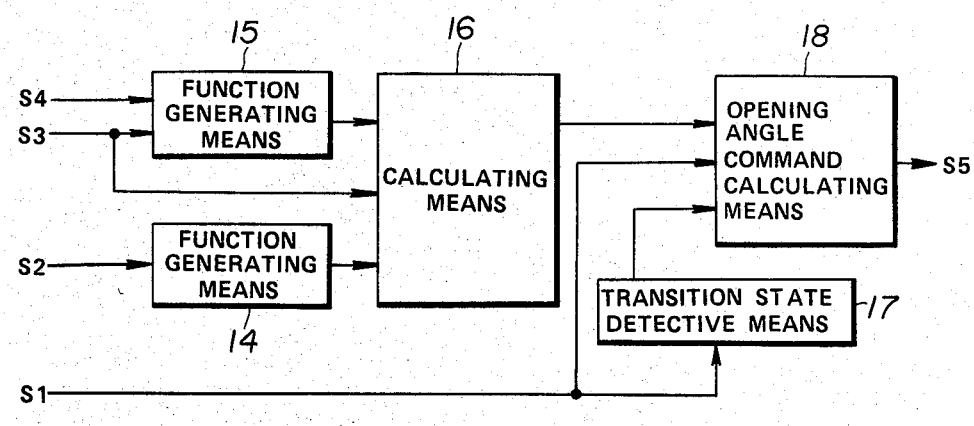
FIG. 7 is an internal block circuit diagram of an arithmetic operation unit 10 shown in FIG. 3.

FIG. 7 is a block diagram of the internal structure of one example of the arithmetic operation unit 10 shown in FIG. 3.

Figure 9:
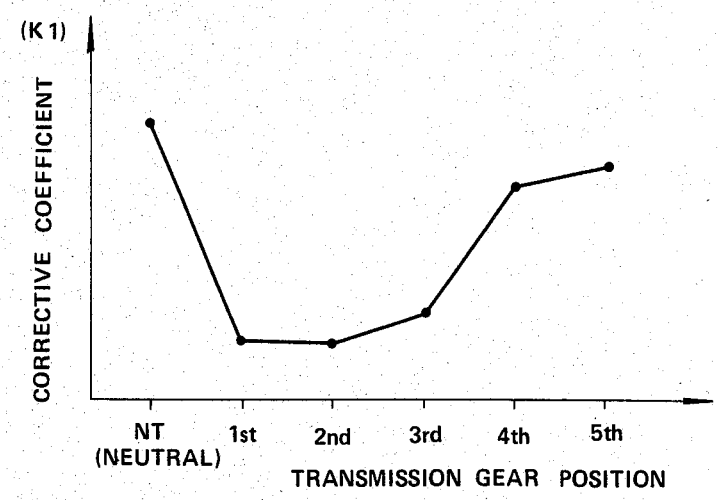

In FIG. 7, function generating means 14 receives a transmission position signal S2 and outputs a corrective coefficient K1 according to the gear position of the transmission. The value K1 is larger in fourth, fifth, or neutral NT gear (engendering faster response characteristics) and smaller in first or second gear (resulting in slower response characteristics). This can be appreciated from FIG. 9.

Another function generating means 15 receives engine revolution speed signal S3 and intake air quantity signal S4 from the respectively corresponding sensors (not shown) and outputs another corrective coefficient K2 according to the revolution speed and the torque (corresponding to the intake air quantity). The characteristics of this function generating means 15 are such that as the engine speed and torque increases, the coefficient K2 also increases. This can be appreciated from FIG. 8.

Response speed calculating means 16 receives the coefficients output by the function generating means 14 and 15 and the engine speed signal S3 and calculates the appropriate response rate corresponding to the current operating conditions indicated by these received signals. It should be noted that in general the nature of vehicle body vibrations due to jerking is determined by the structure of the transmission clutch, play between transmission gears, and the rigidity of the suspension. Hence, the desired response rate is calculated by the response speed calculating means 16 by means of table look-up, i.e., empirically obtained optimum response rate values are stored in terms of the operating conditions of the engine and the calculating means 16 reads out the value corresponding to the current combination of input signals. The response rate obtained by the response rate calculating means 16 may be a real response rate value or alternatively may for simplicity of control be a related value adapted for use directly by control system elements.

A transition state detecting means 17 receives the accelerator pedal depression signal S1 and outputs a signal indicating the occurrence or absence of an abrupt intake air flow transition, depending upon the rate of change of the accelerator pedal depression signal S1. The transition state detecting means 17 may, for example, differentiate the accelerator pedal depression signal S1 and compare the differentiated value to a predetermined limit value.

An opening angle command calculating means 18 receives the desired response rate value from the response rate detecting means 16, the transition signal from the transition state detecting means 17 and the accelerator pedal depression signal S1 and outputs a command signal S5 by which the throttle valve 12 is actuated according to the values of the received signals.

For example, while the accelerator position is constant or changing only gradually, the command signal directs the throttle valve to be actuated in immediate correspondence to the accelerator position signal S1, but in response to abrupt changes in accelerator position, the command signal directs the throttle valve to be over or under-controlled according to the response rate derived by the response speed detecting means 16, as described with reference to FIGS. 4 and 6.

Figure 10:
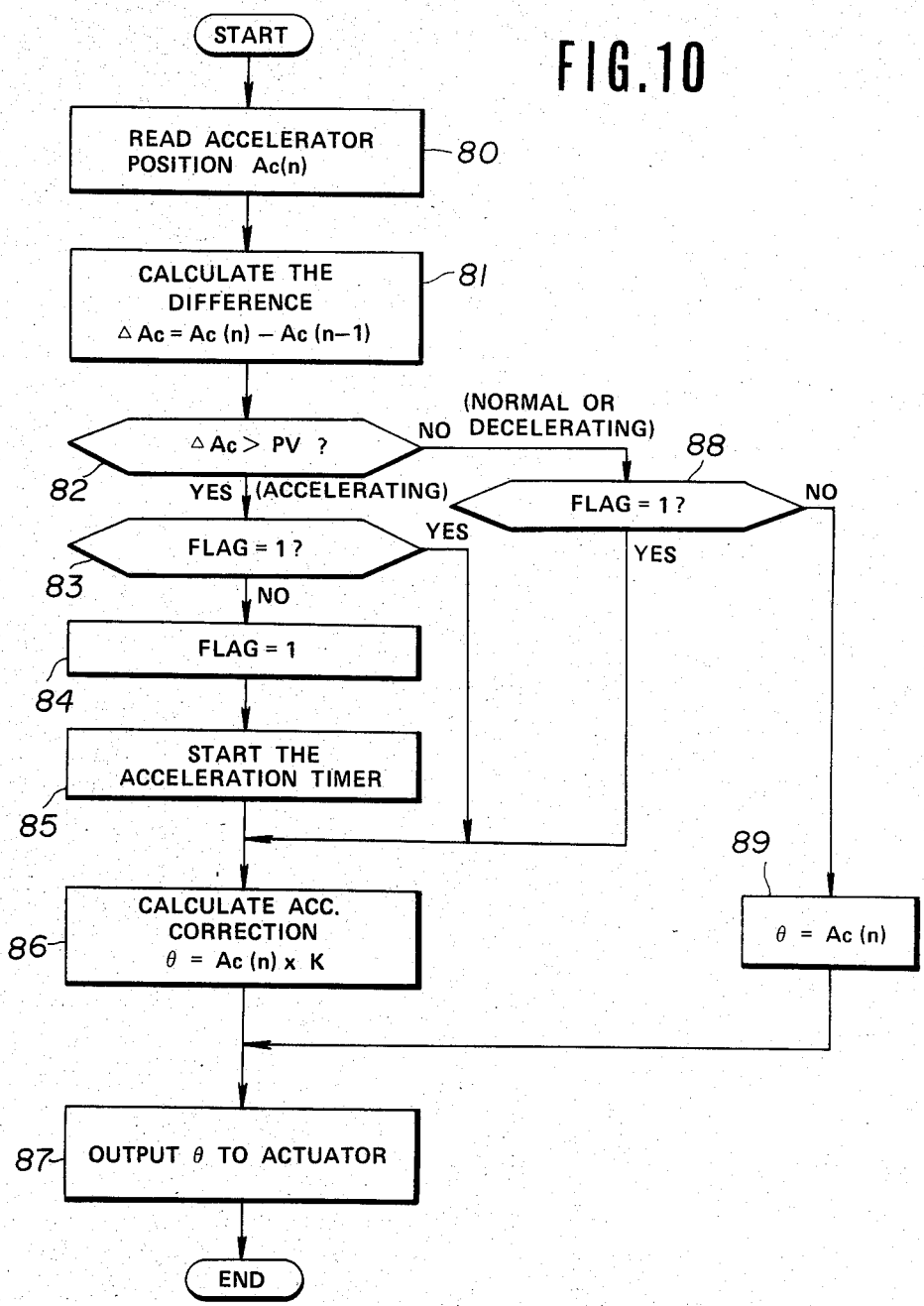
FIGS. 10 and 11 are operational flowcharts illustrating the operation of the arithmetic operation unit 10.

FIG. 10 is a flowchart of a control program executed by the arithmetic operation unit 10, which comprises a microcomputer. The program shown in FIG. 10 is executed at regular intervals and may in fact be only one of a plurality of engine control programs executed by the arithmetic unit 10.

As shown in FIG. 10, in step 80 the CPU reads data Ac(n) representing the angle through which the accelerator pedal is depressed, as indicated by the value of the accelerator position signal S1. In the next step 81, the difference $\Delta Ac$ between the current value Ac(n) and the value Ac(n−1) retained from the previous cycle of execution is calculated.

In the next step 82, the CPU determines whether $\Delta Ac$ is greater than a predetermined value PV. If $\Delta Ac > PV$ in the step 82, indicating that the vehicle is accelerating abruptly, the routine goes to step 83. In the step 83, the CPU checks to see whether an acceleration correction flag is "1". The acceleration correction flag is a flag indicating whether or not acceleration correction is currently being carried out. If the flag has the value "1", the acceleration correction is currently being carried out. If the flag has the value "0", the acceleration correction is not being carried out.

If the flag is 0 in the step 83 (NO), this means that the acceleration correction is not yet being carried out so that acceleration correction should start with the present cycle of program execution. Therefore, the routine goes to step 84, in which the acceleration correction flag is set to "1". Thereafter, the routine goes to step 85 to start an acceleration correction timer. The acceleration correction timer is a software timer serving to clock the acceleration correction for the predetermined time T1 and no longer. After the predetermined time has passed, the acceleration correction flag will be reset to "0".

If the flag is 1 in the step 83(YES), the routine goes directly to step 86 since acceleration correction is already being carried out.

In step 86, following step 83 or 85, the value $\theta$ of the acceleration command signal is arithmetically derived by multiplying the value Ac of the angle through which the accelerator pedal is depressed by the correction coefficient K (to be described later). The value $\theta$ of the acceleration command signal corresponds to the desired opening angle of the throttle valve.

In step 87, the arithmetic operation unit 10 drives the actuator to adjust the angle through which the throttle valve is opened to match the value $\theta$.

If $\Delta Ac \leq PV$ in the step 82, indicating that the accelerator is not being abruptly depressed, the routine goes to step 88. In the step 88, the CPU determines whether the acceleration correction flag is set to 1. If the flag is set in the step 88 indicating that the rate of acceleration is being corrected, the routine goes to step 86.

If the flag is reset (NO) in the step 88, this means that the engine is not to be abruptly acceleration, and acceleration correction is not being carried out. In this case, the routine goes to step 89 wherein the value Ac(n) of the angle through which the accelerator pedal is depressed is directly outputted as the value $\theta$ of the opening angle command signal.

Figure 11:
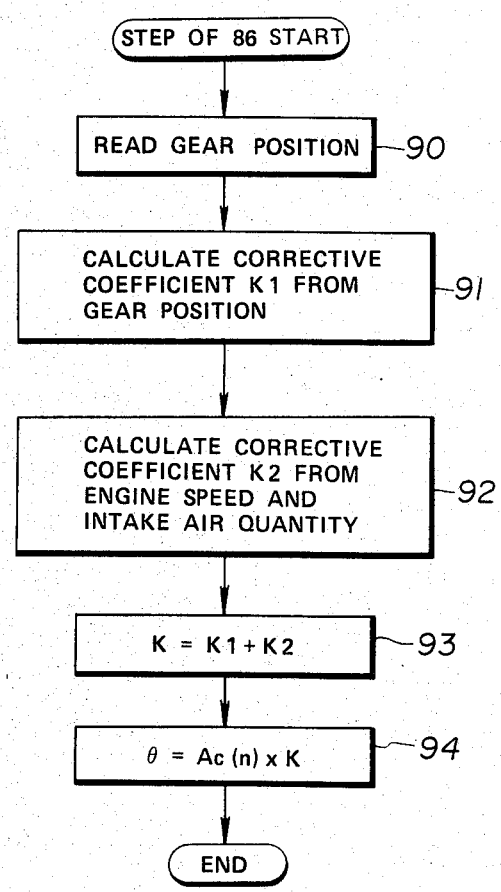

FIG. 11 is a flowchart of the arithmetic operations carried out in the step 86 in FIG. 10.

In step 90, the CPU reads the gear position of the transmission as indicated by the transmission gear position signal S2. In the next step 91, the corrective coefficient K1 is derived from the above-described transmission gear position, as described with reference to FIG. 9.

Figure 8:
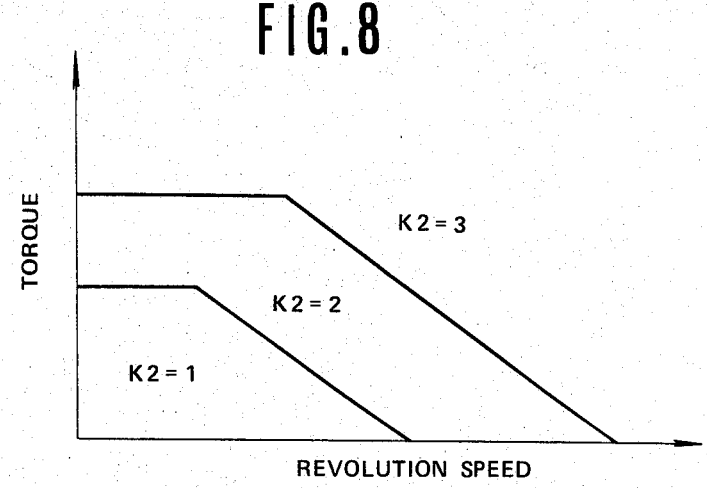
FIGS. 8 and 9 show characteristic curves used by the arithmetic operation unit 10.

In the next step 92, the corrective coefficient K2 is calculated from the values of engine speed and intake air quantity, as described with reference to FIG. 8.

In the next step 93, a corrective coefficient K is calculated by adding the corrective coefficient K1 to the corrective coefficient K2. The effective response rate depends in part on the corrective coefficient K.

In the next step 94, the value $\theta$ of the correction command signal is arithmetically derived by multiplying the current value of the angle Ac(n) through which the accelerator pedal is depressed by the corrective coefficient K.

In this way, the response rate of the intake duct negative pressure is controlled by adjusting the angle through which the throttle valve is opened to a larger or smaller value than the angle corresponding to the position of the accelerator pedal for the predetermined time T1. Consequently, drivability and responsiveness can be harmonized.

It should be noted that although FIGS. 7 through 11 are concerned with the exemplary arithmetic operation unit 10 illustrated in FIG. 3, the embodiment shown in FIG. 5 which carries out independent control of the bypass valve opening angle, can similarly control the response rate of intake air pressure by adjusting the overall intake flow cross-section in response to abrupt depression of the accelerator pedal.

As described hereinabove, since the system according to the present invention can control the opening angle of the throttle valve and of the bypass valve to achieve an appropriate response of the intake pipe negative pressure according to engine operating conditions and transmission gear positions to changes in the position of the accelerator pedal, optimum control of intake air flow for both drivability and responsiveness can be achieved while suppressing jerking.

It will be clearly understood by those skilled in the art that the foregoing description is made in terms of preferred embodiments and various changes and modifications may be made without departing from the scope of the present invention, which is to be defined by the appended claims.

What is claimed is:

1. A system for a vehicular internal combustion engine, comprising:
    (a) first means for monitoring at least one engine operating variable;
    (b) second means for detecting a gear position of an engine power transmission mechanism; and
    (c) third means for variably controlling the rate of change of negative pressure in an intake manifold of the engine in response to changes in desired intake air flow in accordance with at least one of the engine operating variable monitored by said first means and the gear position of the engine power transmission mechanism detected by said second means such that the rate of change of negative pressure is faster when the gear is placed in at least one of a high geared position and a neutral position than at a low geared position.

2. The system according to claim 1, wherein said third means comprises:
    (a) fourth means for detecting a desired degree of acceleration or deceleration;
    (b) fifth means for deriving a suitable rate of change of negative pressure in the intake manifold of the engine with respect to the desired degree of acceleration or deceleration detected by said fourth means in accordance with the engine operating variable monitored by said first means and the gear position detected by said second means;
    (c) sixth means for calculating an flow cross-section area through the intake manifold in accordance with the desired degree of acceleration or deceleration detected by said fourth means and the rate of change derived by said fifth means; and
    (d) seventh means for controlling the position of a valve determining the flow cross-section through the intake manifold in accordance with the flow cross-section calculated by said sixth means.

3. The system according to claim 2, wherein said fifth means derives the rate of change on the basis of a first coefficient corresponding to engine speed and engine torque monitored by said first means, a second coefficient corresponding to the transmission gear position detected by said first means and engine speed monitored by said first means.

4. The system according to claim 2, wherein said sixth means calculates the flow cross-section in accordance with the desired degree of acceleration detected by said fourth means in the absence of an abrupt increase in desired acceleration and in accordance with the rate of change derived by said fifth means for a predetermined period of time in response to an abrupt increase in the desired acceleration.

5. The system according to claim 4, wherein said seventh means comprises a throttle valve located within the intake manifold and an actuator for controlling the opening angle of said throttle valve in accordance with the flow cross-section calculated by said sixth means.

6. The system according to claim 5, wherein said sixth means assigns the flow cross-section past said throttle valve an enhanced value for a predetermined time after an abrupt increase in desired acceleration so that the rate of change of the intake manifold pressure is increased during acceleration.

7. The system according to claim 4, wherein said seventh means comprises a bypass valve located within a bypass passage bypassing a throttle valve located within the intake manifold and an actuator for controlling the position of said bypass valve so as to control the flow cross-section through said bypass passage in accordance with the flow cross-section calculated by said sixth means.

8. The system according to claim 7, wherein said sixth means assigns the flow cross-section past the bypass valve an enhanced value for a predetermined time after an abrupt increase in desired acceleration so that the rate of change of the intake manifold pressure is increased during acceleration.

9. The system according to claim 1, wherein said first means monitors an engine speed and engine torque and wherein said third means variably controls the responsiveness of the rate of change of negative pressure in an intake manifold of the engine in response to changes in desired intake air flow in accordance with at least one of the engine speed and engine torque monitored by said first means and the gear position of the power transmission detected by said second means such that as the engine torque and engine speed increase, the responsiveness of the change rate increases.

10. The system according to claim 9, wherein said first means monitors the engine torque from an intake air quantity.

11. A method for controlling intake air flow of an internal combustion engine, comprising the steps of:
 (a) detecting whether the engine is to be abruptly accelerated on a basis of the rate of change of the position of an accelerator;
 (b) activating a timer for a predetermined period of time when the engine is to be abruptly accelerated;
 (c) monitoring a gear position of an engine transmission and calculating a first coefficient on the basis of the gear position;
 (d) monitoring a predetermined engine operating parameter and calculating a second coefficient on the basis of the engine operating parameter;
 (e) calculating a corrective value for the rate of change of intake air flow rate by multiplying a value indicative of the position of the accelerator by the sum of said first and second coefficients; and
 (f) adjusting the flow cross-section of an intake passage leading to the engine by the corrective value calculated in said step (e) for said predetermined period of time.

12. A system for controlling intake air flow of a vehicular internal combustion engine, comprising:
 (a) first means for detecting whether the engine is to be abruptly accelerated on a basis of the rate of change of the position of an accelerator;
 (b) second means for activating a timer for a predetermined period of time when the engine is to be abruptly accelerated;
 (c) third means for monitoring a gear position of an engine power transmission and calculating a first coefficient on the basis of the gear position;
 (d) fourth means for monitoring a predetermined engine operating parameter and calculating a second coefficient on the basis of the engine operating parameter;
 (e) fifth means for calculating a corrective value for the rate of change of intake air flow rate by multiplying a value indicative of the position of the accelerator by the sum of said first and second coefficients; and
 (f) sixth means for adjusting the flow cross-section of an intake passage leading to the engine by the corrective value calculated in said step (e) for said predetermined period of time.

13. A method for controlling intake air flow of an internal combustion engine, comprising the steps of:
 (a) detecting whether the engine is to be abruptly accelerated on a basis of the rate of change of the depression position of an accelerator associated with an engine intake manifold;
 (b) activating a timer for a predetermined period of time when the engine is to be abruptly accelerated detected by said step (a);
 (c) setting a response speed of negative pressure in the engine intake manifold to the depression position of the accelerator;
 (d) calculating an opening angle command signal according to the set response speed in said step (c) and the depression position of the accelerator, the opening angle command signal being calculated so that the opening angle value of opening angle adjusting means installed within the engine intake manifold for adjusting a flow-cross section thereof is made different from a value of the opening angle corresponding to the depression position of the accelerator while the timer is activated; and
 (e) controlling the opening angle of the opening angle adjusting means according to the calculated opening angle command signal.

14. The method according to claim 13, wherein said step (c) comprises the steps of:
 (f) monitoring a gear position of an engine power transmission and calculating a first coefficient on the basis of the monitored gear position;
 (g) monitoring a predetermined engine operating parameter and calculating a second coefficient on the basis of the monitored engine operating parameter; and
 (h) calculating a corrective value of the response speed of the negative pressure in the engine intake manifold by multiplying a value indicative of the position of the accelerator by the sum of the first and second coefficients, the corrective value being the response speed.

* * * * *